C. W. LANCASTER.
Muzzle-Loading Ordnance.
No. 9,830.
4 Sheets—Sheet 2
Patented July 5, 1853.
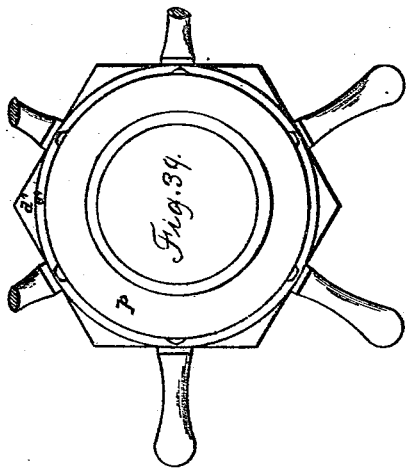
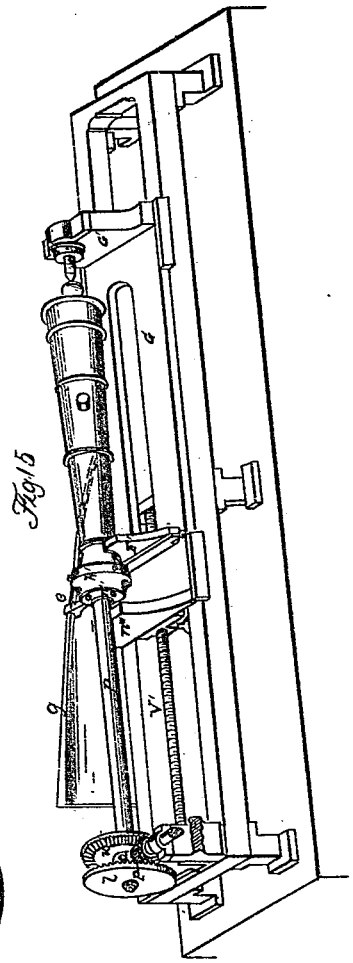
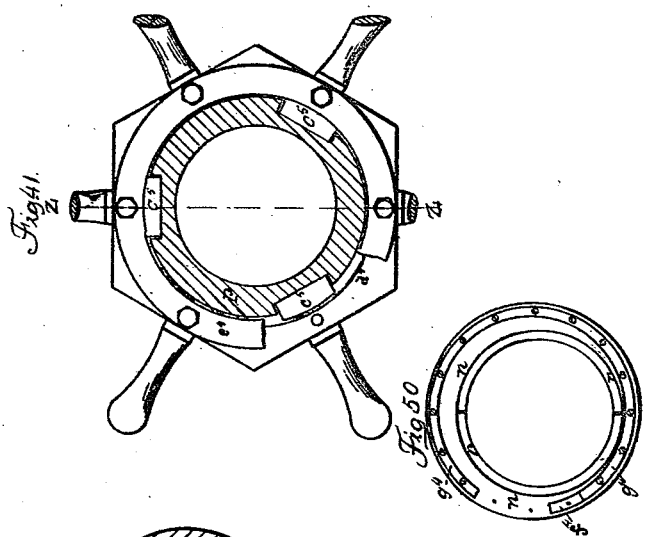
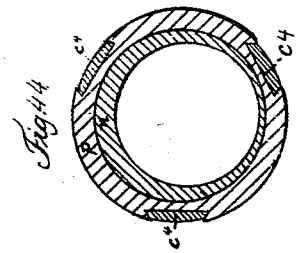
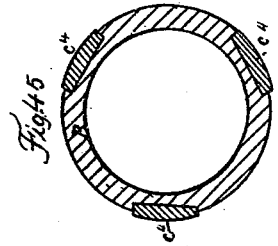
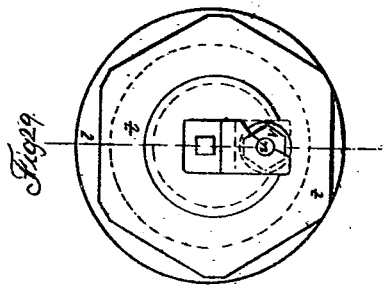
WITNESSES.
INVENTOR.

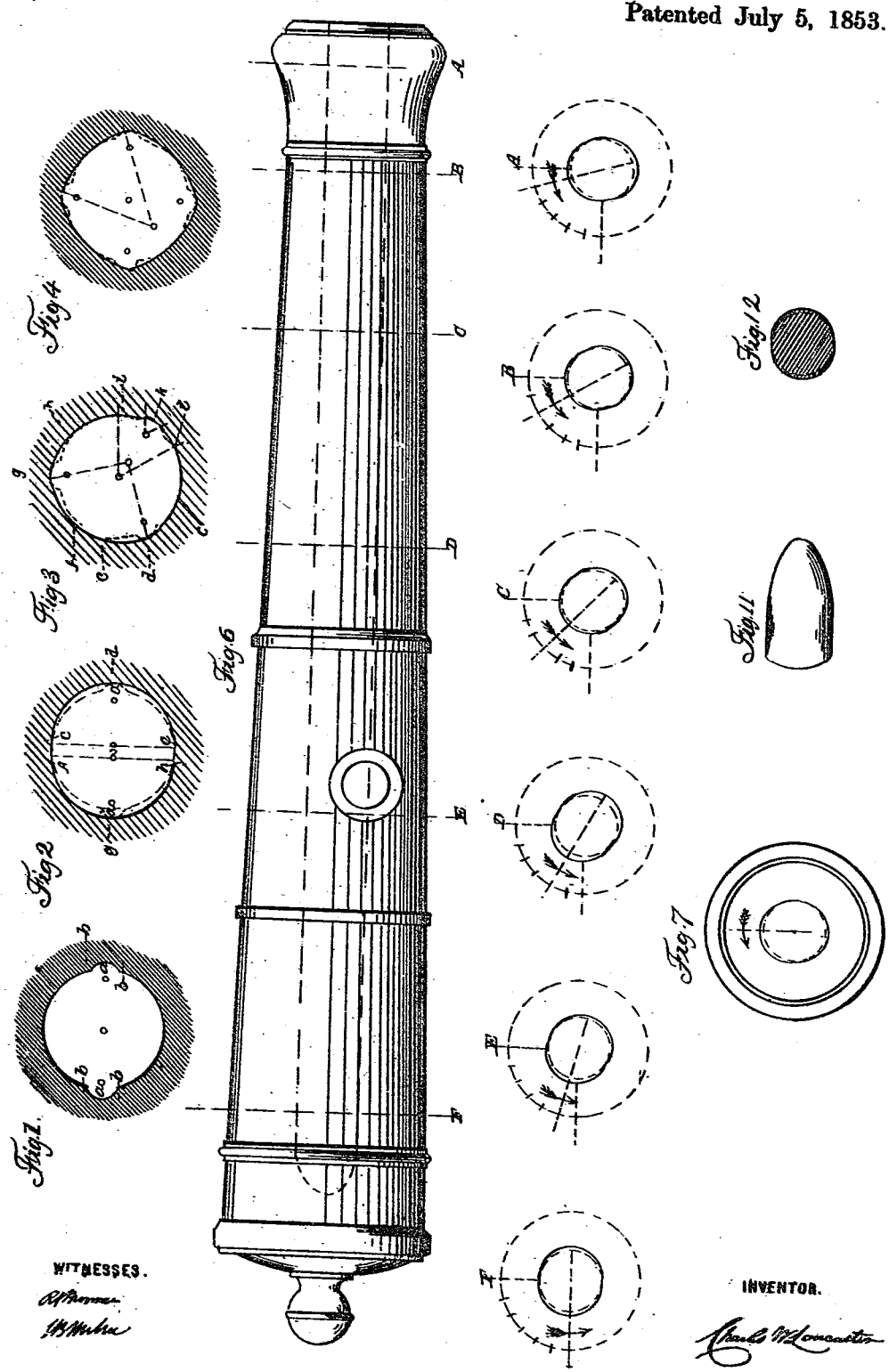

C. W. LANCASTER.
Muzzle-Loading Ordnance.
No. 9,830.
Patented July 5, 1853.
4 Sheets—Sheet 3.
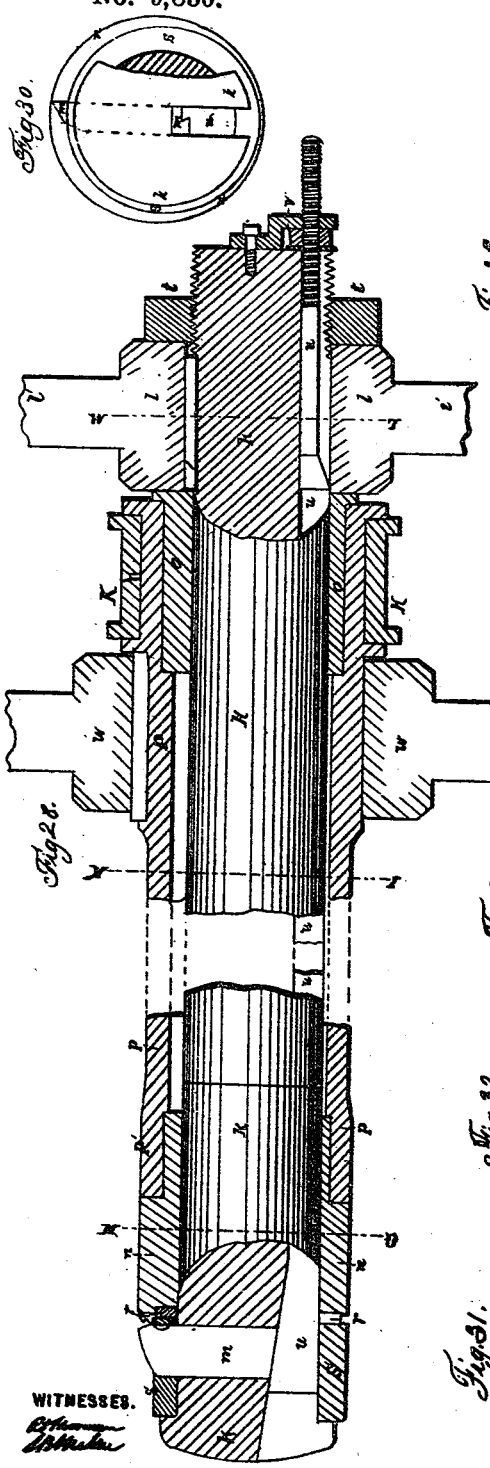
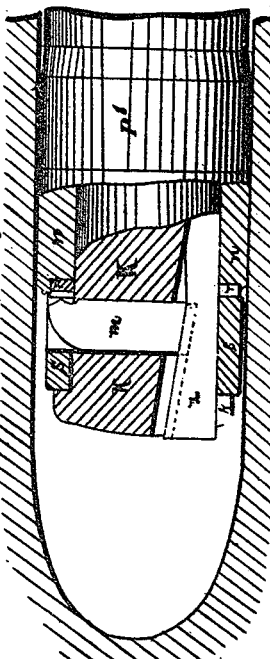
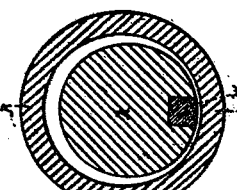
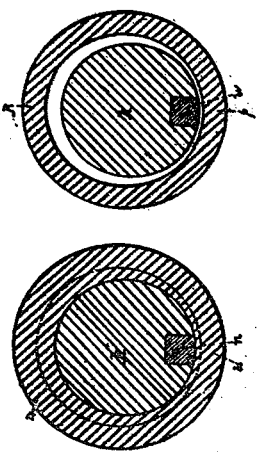
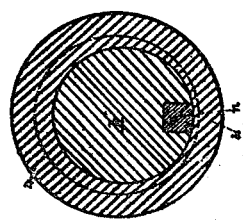
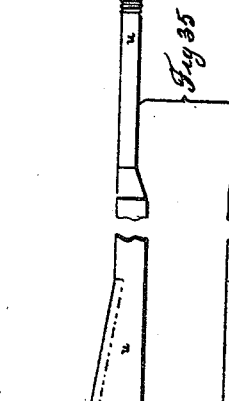
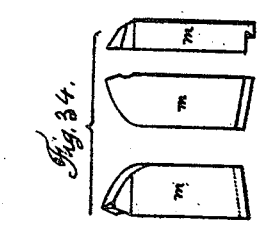
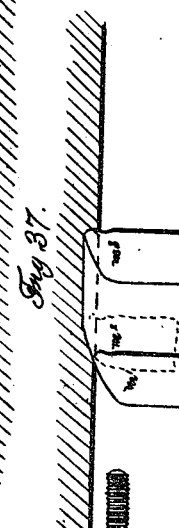
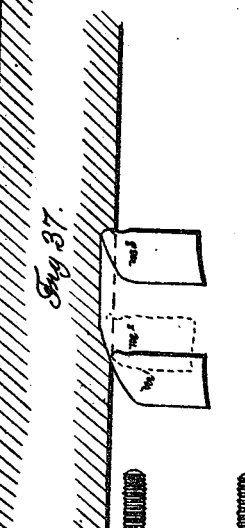
WITNESSES.
INVENTOR.

C. W. LANCASTER.
Muzzle-Loading Ordnance.
No. 9,830.
4 Sheets—Sheet 4.
Patented July 5, 1853.
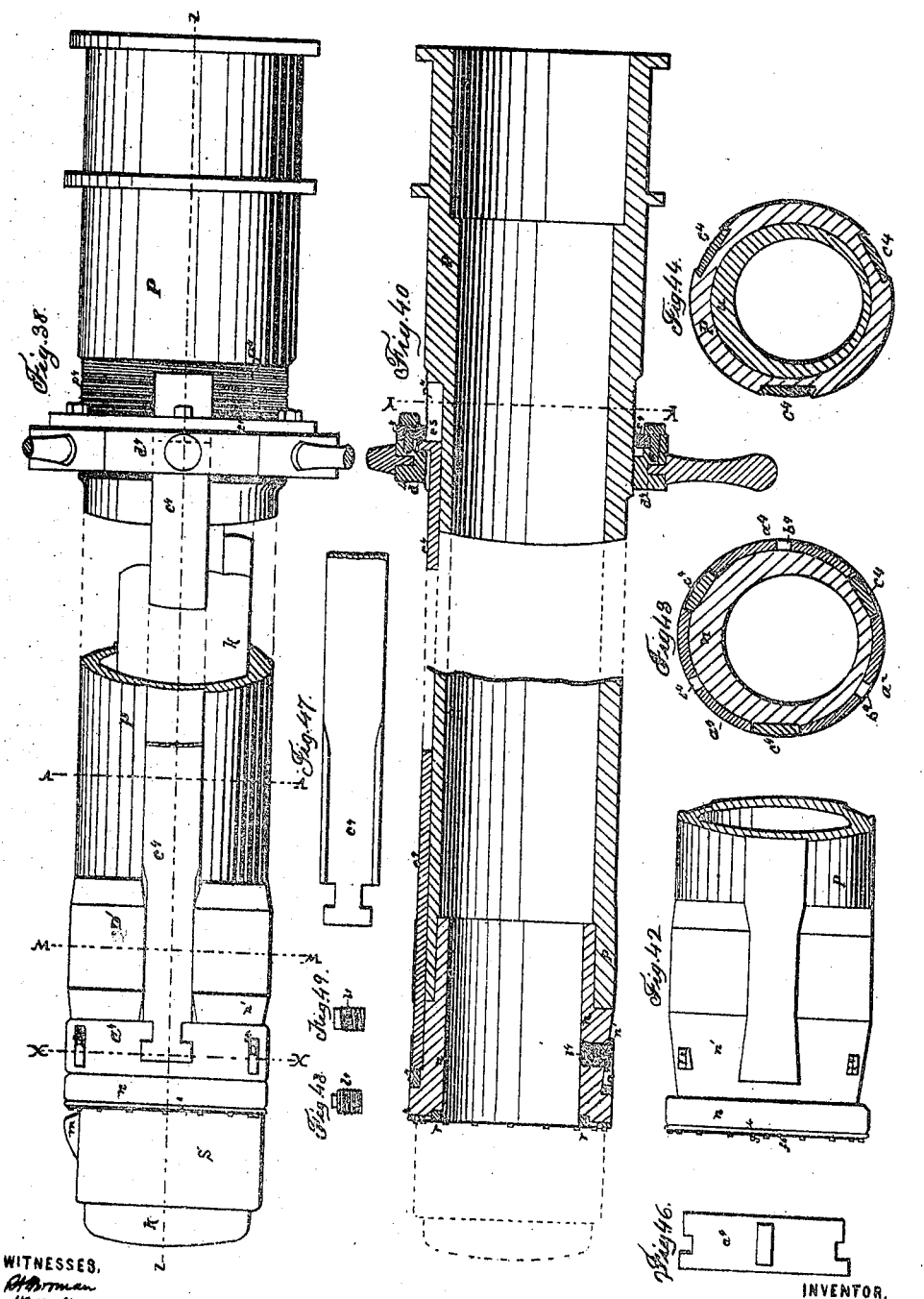

UNITED STATES PATENT OFFICE.

CHARLES W. LANCASTER, OF NEW BOND STREET, COUNTY OF MIDDLESEX, ENGLAND.

IMPROVEMENT IN THE MANUFACTURE OF CANNON AND OTHER FIRE-ARMS.

Specification forming part of Letters Patent No. 9,830, dated July 5, 1853.

*To all whom it may concern:*

Be it known that I, CHARLES WILLIAM LANCASTER, of 151 New Bond Street, in the county of Middlesex, England, gun-maker, a subject of the Queen of Great Britain, have invented certain Improvements in the Manufacture of Cannon and other Fire-Arms; and I do hereby declare that the nature of my said invention and in what manner the same is to be performed are fully described and ascertained in and by the following statement thereof, reference being had to the drawings hereunto annexed—that is to say:

My improvements consist in giving a peculiarly-shaped bore to the gun, whereby the angular groove usually cut in such arms, more particularly in rifles, is dispensed with, while the advantageous effects of such grooves are yet retained. This peculiarity of boring I also apply to cannon, as will more fully appear in the following description.

Before describing my machine and boring, tools I will illustrate the nature and peculiarity of the bore of the guns.

The making of grooves in the barrels of rifles in the ordinary manner occasions the formation of an angle at each side of every groove, as shown at Figure 1 of the drawings hereunto annexed, which figure shows a transverse section of the barrel of a rifle upon an enlarged scale, having two ordinary grooves, $a$ $a$, made in it, and by the making of these grooves the angles $b$, $b$, $b$, and $b$ are formed. These angles are objectionable; and the object of this part of my invention is to cut these angles and to alter the internal form of a barrel or bore, so that a transverse section of it will show the substitution of a curved or straight line, or of a line partly curved and partly straight in lieu of each of the angles I have mentioned.

In Fig. 2 I have shown a transverse section of the barrel or bore of a rifle or gun, also upon an enlarged scale, in which, in lieu of having two grooves such as shown in Fig. 1, and also by the dotted lines, it is made with two longitudinal cuts of the sectional forms $c\,d\,e$ and $f\,g\,h$, a curved sectional line or form being substituted for each angle of each of the two grooves. This mode of constructing the interior or bore of a barrel has the effect of making its transverse section assume a form which is oval or elliptical, or nearly so. The longitudinal cuts of this barrel must have a spiral direction given to them in like manner as if they were grooves; and if a barrel so formed be charged with a ball the sectional figure of which has the same oval form as and properly fits to the bore of the barrel, the twisting effect produced upon the ball during its progress along the barrel when the piece is discharged will be of the same description as that produced upon a ball discharged from an ordinary rifle. I have in Fig. 2 shown the longitudinal cuts made in sectional curved forms or with sectional curved lines extending from $c$ to $e$ and from $f$ to $h$, because I deem that to be the best form to use in constructing such a barrel; but the shapes of the curves used in forming such cuts and the extent of them may be varied according to circumstances. A barrel made in this form has no angles in the inside of it which can offer any frictional impediment to the progress of the ball along the barrel, and the interior of the barrel may be cleansed with more facility or more effectually than a barrel having ordinary grooves. This mode of forming the interior of a barrel for shooting with ball so as to avoid having any angles may be applied to several other forms of barrel as well as that shown in Fig. 2. Thus in Fig. 3 I have shown a section of a barrel made with three longitudinal cuts in lieu of a similar number of grooves, the dotted lines in the figure showing the form of a barrel made with three ordinary grooves, and the full lines the form of a barrel made with three cuts in lieu of grooves. In this figure I have shown each of the two cuts $c\,d\,e$ and $f\,g\,h$ as made in forms the transverse sections of which are curved, as shown in the figure; but other curves may be adopted in making the cuts; and instead of making such cuts in forms the sections of which are wholly curvilinear, as shown in the cuts $c\,d\,e$ and $f\,g\,h$, they may be made in forms the sections of which will be partly curved and partly straight, as shown in the cut $i\,k\,l$, Fig. 3 the sides $i\,k$ and $k\,l$ of that cut being straight, as shown in the figure.

In Fig. 4 I have also shown a mode in which a barrel may be made with four longitudinal cuts in lieu of a similar number of grooves, the figure showing in full lines the sectional figure of the bore of a barrel made with four curved cuts, and in dotted lines the sectional form the interior of the barrel would have assumed if made with four ordinary grooves. The same mode or modes of making cuts in lieu of grooves in gun-barrels may be applied to the making of any other convenient number of longitudinal cuts in a barrel; but I deem four cuts to be as many as will be practically useful; but whatever may be the number of longitudinal cuts which I may in any case make in the interior of a gun-barrel, I make it so that there shall be no angle formed. Before making longitudinal cuts in the inside of a barrel, I would of course bore it true in the ordinary manner, and then proceed to make the intended cuts. These cuts will be best made within a small barrel by any of the ordinary machines or apparatus which are usually called "rifling-machines" or "rods," the shapes of the cutters being varied so as to produce cuts of the sectional figures required; but such longitudinal cuts as I have described, when made in the interior of the cannon, and when of the same description as those shown in Fig. 2, will be best made by my boring-machine, hereinafter described. For small-arms made with two longitudinal cuts, as aforesaid, the depth of each cut should be about one-eightieth part of the diameter of the bore, so that a transverse section of the barrel will show an oval or elliptic bore the two diameters of which will be in the proportion of about thirty-nine to forty. For cannon made with two longitudinal cuts, as aforesaid, or bored with my improved machine, hereinafter described, the two diameters should vary from the proportion of twenty-four to twenty-five to about the proportion of sixteen to seventeen, which will be found sufficient for cannon of the largest size. The forms of the longitudinal cuts, or the extent to which they deflect from a straight line in a spiral direction as they twist from one end of the interior of a gun to the other, may be regulated in the ordinary manner, or in a novel manner to be hereinafter described.

In Fig. 6 I have shown a side view, and in Fig. 7 a front view, of the muzzle end of a cannon the bore of which has been made with two longitudinal cuts, according to this part of my invention, the dotted lines in Fig. 7 showing the round cylindrical bore originally made in the cannon, and the full lines immediately surrounding the dotted lines showing the sectional form of the orifice at the muzzle after the two longitudinal cuts have been made. My improved mode of deflecting these cuts in a spiral direction within the bore of the cannon is shown by Fig. 7 in conjunction with the several transverse sections A, B, C, D, E, and F, each of these transverse sections being to be considered as made at that part of the cannon indicated by a dotted line which is marked with the same letter as the section. The spiral deflection of the cuts in this cannon shown by these figures amounts to a quarter-twist, the deflection or twist progressively increasing from the breech to the muzzle of the gun in a manner well known.

I will now describe the tool for giving the elliptical cut, and afterward the method of applying it in the machine in connection with the plan for giving the increasing twist.

Fig. 34 shows three views of the cutter-tool, and Fig. 35 exhibits two views of the bar employed for advancing and drawing back the cutter-tool. Fig. 36 exhibits the cutter-tool and a part of the tube as it would appear when in the bore of the cannon. Fig. 37 exhibits the change of position of the cutter-tool from the commencement of the cut.

In Figs. 28, 29, 30, 31, 32, 33, $k$ marks a boring-rod, upon one end of which is an ordinary beveled wheel, $l$, the arms $l'$ of which only are shown, and which is connected or attached by a feather, *, let into the said rod, the other and opposite end of which carries the cutter-tool $m$, and round the ends of which rod $k$ eccentric collars $n$ and $o$ are placed. Around these collars I place a cylindrical iron tube, $p$, (which I call a "boring-tube,") fixing it to the collar $n$ at one end and to the roller $o$, with liberty to revolve in the brasses of a plumber-block, K', and having a wheel, $w$, fixed upon it similar to the wheel $l$, (the nave and part of the arms only shown,) fixed on the rod $k$. In consequence of the collars $n$ and $o$ being eccentric, the centers of the shaft $k$ and tube $p$ will not, of course, coincide, the difference being in proportion to the amount of eccentricity required, which must be exactly one-fourth of the difference between the longer and shorter axes of the elliptical bore intended to be produced, which, in the drawings, is shown as sixteen is to seventeen. I connect the cutting-tool $m$ to the rod $k$ in the manner exhibited at Figs. 28 and 30, at which figures it will be seen that the end of the rod $k$ is formed taper, and fits into the taper eccentric-collar $o$, and it may be made of brass or gun-metal. It will also be seen by reference to Fig. 28 that the steel collar $n$ fits into the end of the tube $p$, which should be turned out to receive it, and there is a circular recess formed at the outer end of the steel collar $n$, into which two semicircular-shaped pieces of brass or gun-metal, $r\,r$, are fitted and placed, and there is a collar of wrought-iron, $s$, placed upon that end of the rod $k$ to which the cutting-tool $m$ is connected, the said collar being formed with an opening, and also the rod $k$ with a passage at this part to receive the cutting-tool $m$. The end of the rod $k$ is "upset" or enlarged, so as to form a shoulder for one end of the collar $s$ to bear against, the other and opposite end of the collar taking its bearing against the pieces $r\,r$. In order to keep the rod $k$ and the cutting-tool perfectly steady as they revolve, I employ a tightening-nut, $t$, which I place upon the end of the rod $k$, that having a screw formed thereon to receive it, as exhibited at Fig. 28. I effect the movement of the tool within the collar $s$ in the following manner:

Along the entire length of the rod $k$ a groove is formed, into which a rod or bar, $u$, is placed, and has free liberty to slide therein, and I form one end of this bar with an inclined plane, as exhibited at Figs. 28 and 35, and I form the inclined surface of the bar $u$ so as to fit the end of the tool $m$ exhibited at Fig. 34, so that when such part of the tool is placed within the V-shaped recess the inclined part will have forced the tool outward, as exhibited at Fig. 28, and when the bar is in the position exhibited at Fig. 36 the tool will be drawn inward, and I effect this movement of the bar $u$ by means of a key or spanner placed upon the nut $v$, situated upon the screwed end of the bar $u$, as exhibited at Figs. 28 and 29.

The operations of this machine or apparatus are performed in the following manner: The operator first places and secures the cannon to the castings F' G', Fig. 15, the cannon having been previously bored a true cylinder. He then adjusts the cutting-tool $m$, taking care to place it in the position exhibited at Fig. 36, after which he advances the cannon over the said cutter-tool by turning round the screw V', which causes the carriage G to move until the breech end of the cannon arrives over the cutter-tool $m$. The screw V' is put in motion by an ordinary spur-wheel gearing into another attached to $w$, and is not represented in the figure. The wheels $l$ and $w$ are set in revolution in contrary directions, the wheel $l$ driving the cutter-bar $k$, while the wheel $w$ drives the tube, and the motion of the screw V' slowly advances the carriage G, with the cannon upon it, in a manner common to slide-lathes and other boring-machines. The pinion P', taking or gearing into the beveled wheels $w$ and $l$, will cause those wheels to be driven or moved in opposite directions, and thereby effect the necessary elliptical movement of the cutter-tool $m$. The operator is to bring the cutter-tool $m$ gradually into work by advancing it slowly forward by means of the nut $v$ at Figs. 28 and 29 until the said cutter-tool has been pushed out to its full extent, as exhibited at Fig. 37, at which last-mentioned figure $m'$ marks the position of the cutter-tool at the commencement of the cut, $m^2$ the position when the tool has been pushed out to its full extent, and $m^3$ the tool with the point rounded, exhibiting also the appearance of the bore during the operation. By forming the part $p'$ of the tube $p$ of the same diameter as the circular bore of the cannon, it will serve as a guide to keep the cutter-tool steady during its rotation. When, however, the cutter has approached the mouth of the cannon, and just before dropping out, in order that it shall be supported so as to take the last cut, and therefore keep the perfection of the elliptical bore, it is necessary to supply an additional support. This I accomplish by the false mouth-piece or cap represented in Fig. 15 at $k'$. This, as shown in the figure, is securely bolted over the mouth by strong set-screws. A second cap having a hole just large enough to pass the boring-tool through is bolted onto $k'$, as seen at $n'$. This latter cap or flange stands off clear of the muzzle, and therefore will still support the boring-tool until the cutter has fully cleared the muzzle and completed its work. When the tube $p$ has been run clear of the cannon and also false cap, to prevent the end from falling down, a rest-block is fixed at $n''$ to support it. If, now, the cannon were bored out, it would be formed with an elliptical chamber whose major axes on all sections of the bore would be in the same plane, or the bore would be straight. To derive any useful effect, therefore, from such a shape, it is evident that the positions of the major axes should be constantly varying from that plane in the manner shown in Fig. 6 at A B C D, &c. This is for the purpose, as before explained, for forming a twist without angular corners, the injurious effect of which has been set forth. I wish this twist also, instead of being equal, to be accelerated toward the muzzle, according to the plan of the most approved form of rifles, to accomplish which is the object of the part to be now described, and it is effected by gradually turning the cannon or gun on its axis as centered in the slide-frame, with a varying motion as the boring-tool is traversing along parallel to said axis. Therefore, if an increasing twist is to be given, the cannon must turn slowly at first, gradually increasing that motion as the cutter proceeds toward the muzzle. I therefore set up a guide-rail, $g$, on some convenient part of the stationary frame. This rail extends the length of the bore, and is also bent into such curves as will give to the major axis of the elliptical bore the required direction at the various parts of the length of the bore. To some convenient part of the cannon an arm, $e$, is fastened, the forked end of which grasps the curved rail $g$, and thus causes the cannon to be turned, as required. Now, assuming the motion of the machine or apparatus to be continued, and the forked end of the piece $e$, Fig. 15, to embrace the sides of the curved rail $g$, it will be manifest that the forked piece $e$ will be moved in a direction coincident with the curvature of the rail $g$, whereby the cannon, during the operation of boring, will be progressively twisted or turned in accordance with the necessary twist hereinafter stated.

When the bore of the cannon on which I wish to operate is not previously of a uniformly cylindrical shape, or should it be taper in respect of its length, I construct the said machine or apparatus with a divided ring or collar placed upon the boring-tube, or rather upon its taper eccentric collar, $n$, at that end of it which is near the cutter. This divided ring or collar (which I call an "expanding collar") is capable of being expanded or contracted by the workman to make it fit the bore of the cannon or gun more accurately during the process of boring or cutting, so that the boring tube and rod may work steadily and the cutting-tool cut smoothly; and I also construct the said machine or apparatus with a packing upon that end of the boring-tube which is near to the cutter, in order to prevent the turnings or pieces of metal removed by the cutter from entering between the boring-tube and the interior of the gun, and so producing friction and deranging the operation of the machine.

In Fig. 38 is shown an external elevation of the two ends of the boring apparatus already described, showing the boring-rod, its surrounding tube, and certain other parts in connection with them as applied thereto. Fig. 39, an end view; Fig. 40, a longitudinal section, as taken through the dotted lines Z Z in Figs. 38 and 41; and Fig. 41 is a transverse section taken through the dotted line Y Y in Fig. 40. Fig. 42 is an exterior view of the parts shown in Fig. 38. Figs. 43, 44, and 45 are transverse sections taken through the dotted lines X X, W W, and V V in Fig. 38. In all the above figures excepting 38, the boring rod and tool are supposed to be removed.

Fig. 46 is a detached view of one of the three parts of the expanding collar, each of the pieces being similar in form. Fig. 47 is a detached view of a portion of one of three flat rods for moving the expanding collar, and Figs. 48 and 49 are detached views of one of the three screw-studs hereafter mentioned.

$k$ represents the boring-rod carrying the cutter-tool $m$; $p$, the boring-tube surrounding the rod $k$, and embracing and fixed to the two eccentric collars; $s$, the wrought-iron collar which assists to hold and guide the tool, and $r$ the brass or gun-metal friction-ring against which this collar revolves, but which is made somewhat narrower to allow room for the washer hereinafter described. The movement of the boring-tube in one direction and of the boring rod or tool in the opposite direction will produce the required sectional form of bore, as before described.

$a^4$ $a^4$ $a^4$ is the expanding collar, of steel or gun-metal, in three separate pieces, the interior of which is made taper to correspond with and slide upon the exterior surface of the steel collar $n$ at $n'$, which is made conical at this part.

$b^4$, $b^4$, and $b^4$ are three studs screwed into the collar $n$, each part of the expanding ring being formed with a slot into which one of these studs passes, and serves as a guide for keeping it in its proper position. These pieces are also formed with recesses at their ends where they abut upon each other, into which the T-shaped ends of the flat rods $c^4$, $c^4$, and $c^4$ take each into two of the said pieces, as shown. The other ends of these flat rods are bent or turned up, as shown with regard to one of them at $c$ in Fig. 40. The tube $p$ has channels or grooves on its exterior, in which the rods $c^4$ slide, and at the enlarged portion, at $p'$, these grooves are of a dovetail form, as shown at the figure 44, to fit the edges of the rods, (which at that part are made of a corresponding form,) so as to keep the rods from coming into contact with the interior of the gun. The tube $p$ has also a screw formed on its exterior surface at $p^4$, portions of which are cut away by the said grooves.

$d^4$ is a screwed nut or collar, which is furnished with handles for conveniently turning it on the screwed part $p^4$ of the tube.

$e^4$ is a ring screwed to the nut $d^4$ so as to overlap a rabbet or recess in the said nut and form a circular groove, into which the portions $c^5$ of the flat rods $c^4$ project. The ring $e^4$ is of course screwed on after the rods are so placed. It also obvious that by turning the nut $d^4$ on its screw it can be made to move toward either end of the tube $p$, and in so doing will slide the flat rods $c^4$, and thereby move the three pieces of the expanding ring $a^4$ in the required direction. The movement of the expanding ring by these means in one direction will cause it to expand, and an opposite movement will allow it to contract.

In use the apparatus is to be introduced into the cannon or gun with the ring $a^4$ in its contracted state, as shown in the drawings, and the ring is then to be expanded to the requisite extent, and kept so expanded during the operation of the tool; and as this operation proceeds the ring is from time to time to be expanded or contracted as may be necessary for securing the steady working of the apparatus.

Fig. 50 is an end view of the eccentric-collar $n$ which forms the end of the boring-tube, certain parts being removed in order more clearly to exhibit the method of fixing the packing before mentioned.

$f^4$ is a ring of leather, india-rubber, or similar flexible material, which is screwed by means of an annular flat plate, $g^4$, and screws to the end of the boring-tube. The outer edge or periphery of this ring is made sufficiently large to cause it to keep constantly in contact with the interior of the gun as it slides along during the operation of the apparatus.

What I claim as of my own invention, and desire to secure by Letters Patent of the United States, is—

1. The method of boring the barrel of a gun or other fire-arm so that a cross-section thereof would be in the form either of an ellipse or of a series of curves, by the mechanism, as described, or its substantial equivalent, as set forth, whereby the injurious action of the angular groove in ordinary rifles is obviated, while all its advantages are retained.

2. The construction of the boring-tool for giving to the bore a form of which the cross-section is not a true circle—that is to say, the combination of the cutter-bar with the boring-tube, the said bar passing through said tube eccentrically, the axes of both being parallel, whereby the elliptical or other shaped bore is given, as described, also the bar $u$ and its inclined plane, in combination with the cutter for regulating the depth of the cut, as described, also the expanding collar at $a^4$, the inclined or beveled space $n'$ on the boring-tube, with the other parts in connection therewith, as described, for the purpose of guiding the boring-tool when boring out an irregularly-formed cylinder, as described.

3. The curved rail $g$, or other like fixture, for giving the proper motion to the barrel of the gun during the boring operation by which the spiral or twist is given, as described.

4. The cap $k'$, for supporting the boring-tube just at the moment the cutter is about to clear the muzzle, as set forth.

In witness whereof I, the said CHARLES WILLIAM LANCASTER, have hereunto set my hand this 28th day of November, 1851.

CHARLES W. LANCASTER.

Witnesses:
  R. A. BROOMAN,
  I. B. MILNE,
*Both of* 166 *Fleet Street, London.*